United States Patent Office 3,536,793
Patented Oct. 27, 1970

3,536,793
METHOD OF MAKING POROUS METAL CARBIDE AGGLOMERATES
Roy E. Norman, Oak Ridge, Tenn., and Rex H. Speas, San Diego, Calif., assignors to the United States of America as represented by the United States Atomic Energy Commission
No Drawing. Filed Feb. 7, 1968, Ser. No. 703,547
Int. Cl. C04b 35/56, 35/64; G21c 3/60
U.S. Cl. 264—.5                                    9 Claims

ABSTRACT OF THE DISCLOSURE

Porous particles of metal carbide or nitride are made by forming low density aggregates of metal oxide and carbon and converting these aggregates to metal carbide at subsintering temperatures in a partial vacuum. Nuclear fuel metal oxide aggregates with carbon made by agglomeration or by a sol-gel process are converted at subsintering temperatures to form spheroids of nuclear fuel carbide having less than about 60% of the theoretical maximum density.

---

The invention disclosed herein was made under, or in the course of, Contract AT(04-3)-167 with the United States Atomic Energy Commission.

This invention relates to particles of metal compounds, and more particularly to methods of making metal carbide particles having relatively low densities. The invention is considered to have particular application with regard to nuclear fuels, but it should be understood that the invention is not limited to such fields because it has uses in other fields wherein porous metal carbide particles are of interest.

For the HTGR reactor it is presently proposed to employ fissile particles which are alloys of uranium 235 and thorium, the thorium being employed as a diluent to restrict fuel burnup within each individual particle and to also provide a contribution to the negative temperature coefficient of reactivity of a reactor of this type. In such a reactor, there are also provided a group of fertile particles of thorium which, upon the capture of neutrons, becomes fissile uranium 233.

In the future, such bred uranium 233 will be available for use as a part of a recycle core for an HTGR reactor. When a major portion of the fissile material is in the form of U 233, the use of thorium as a diluent for the uranium 235 particle in order to provide a contribution to the negative temperature coefficient of reactivity will no longer be needed. At this time, the employment of thorium as a diluent in this fissile material will become undesirable because the worth of the neutron captured by thorium will not be easily recoverable. The uranium 233 which is created as a result of neutron capture by thorium in a thorium-uranium alloy would not be considered especially valuable because it would necessarily be alloyed with uranium 236 (which is an isotropic neutron poison) from which it could be separated only by a relatively expensive process, e.g., in a gaseous diffusion plant.

It has been found that, for instances wherein a negative temperature coefficient of reactivity contribution is not of particular interest, fissile nuclear fuel particles of porous metal carbide have particular advantages in addition to restricting fuel burnup.

It is an object of the present invention to provide an improved method for making porous metal particles of metal compounds. It is a further object to provide a method for making metal carbide particles having a density less than about 60 percent of their theoretical maximum density. A further object is to provide a method for making porous metal carbide spheroids from readily available metal oxide materials. A still further object is to provide an improved method for making porous spheroids of nuclear fuel metal carbide and/or nitride. These and other objects of the invention are more particularly set forth throughout the following detailed description of processes involving various features of the invention.

The invention provides a method for making porous particles of metal compounds having sizes less than about one millimeter. Initially, very porous aggregates are formed of intimate mixtures of metal oxide and carbon in powdered form. These discrete aggregates may then be converted to metal carbide at temperatures below the sintering temperatures thereof in order to preserve as much of their porosity as possible. By these steps, it is possible to obtain porous metal carbide particles having densities less than about 60 percent of the theoretical density of the metal carbide.

Although the primary interest in this process is presently in the production of nuclear fuel particles for nuclear reactors, there are other uses for such porous metal carbide particles, and it is expected that further uses will develop in the future. The method is considered applicable to metals which form metal oxides and metal carbides and which can be converted from metal oxide to metal carbide at temperatures below the sintering temperatures thereof. In general, the metal carbides should have sintering temperatures of at least about 1000° C. Of primary interest are the actinide series elements, which for purposes of this application are defined as thorium, uranium, neptunium and plutonium. Also of interest are the refractory metals, or refractory hard metals, as they are sometimes called. Specific examples of metals of interest include titanium, zirconium, niobium, tantalum, vanadium, hafnium, tungsten, molybdenum, yttrium and technetium. It should also be understood that there is no reason why mixtures of two or more of the foregoing elements cannot be employed to produce particles of a combination of metal carbides.

The carbon used to convert the metal oxide to metal carbide can be used in any suitable form, for example, carbon black, charcoal or graphite. Such different physical forms of carbon function the same chemically, and the particulate form of carbon employed is usually dependent upon its ease of handling in the particular procedure chosen for forming the aggregates of metal oxide and carbon. It is important to provide sufficient carbon for the stoichiometric reduction of the oxide to the carbide. In this respect, substantially all of the oxygen will be removed as carbon monoxide, not carbon dioxide, and the stoichiometric calculations should be made on this basis. Likewise, the metal will be converted to its highest usual valance form, e.g., uranium dicarbide. However, as is pointed out in more detail subsequently in the application, for some purposes it may be desirable to provide additional carbon to that stoichiometrically necessary for the conversion to the carbide.

The process for formation of porous aggregates of metal oxide and carbon, which are to be subsequently converted, is chosen on the basis of its ability to provide aggregates having small size (less than about one millimeter) and containing an excellent dispersion of the metal oxide and carbon granules. One suitable process involves the employment of a vaporizable or carbonizable binder which can be added to a mixture of small granules of metal oxide and carbon to facilitate the formation of aggregates in the desired size range. Another suitable process is commonly referred to as the sol-gel process, and it involves the gelation of droplets of a colloidal sol of metal oxide and dispersed carbon by dehydration, pH change, or otherwise. The importance of the aggregation process lies in the physical characteristics of the porous aggregates produced, and other processes than these two enumerated above can be employed if they will produce low density aggregates having a uniform dispersion of metal oxide and carbon which are of a character that will retain a substantial amount of porosity while undergoing conversion to carbide form.

When an agglomeration process is employed, it is important that the initial sizes of the metal oxide and carbon granules are sufficiently small to permit good dispersion in a mixture thereof and also to facilitate the conversion from oxide to carbide at temperatures below the sintering temperatures of the refractory metal carbide. In this respect, it is considered that the particle sizes of the metal oxide and of the carbon granules should be between about 5 microns and about 0.1 micron. In general, the smaller the particle size the better for an agglomeration process so long as it is possible to make initial aggregates with the desired porosity. If the granules are too small, agglomeration might become difficult.

A suitable binder is used which provides adequate cohesion between the metal oxide and carbide granules and which does not adversely affect the final products. In this respect, the binder may be one which will volatilize at temperatures in the conversion range or one which will pyrolyze at the conversion temperatures to which the aggregates will be subsequently heated. Binders of this general class include naturally occurring substances, such as coal tar pitch, and thermoplastic and thermosetting organic resins, such as polyvinyl alcohol and ethylcellulose. The preferred binder is mineral oil which is a liquid petrolatum that is obtained from the distillation of high boiling (330-390° C.) petroleum fractions. Mineral oil is colorless and odorless and provides a moldable mass that can be worked into agglomerates of the desired size range. Mineral oil provides good holding strength for maintaining the agglomerates in aggregate form throughout such forming processes, and this is particularly important when it is desired to form actual spheroids of the agglomerates, as in a planetary mill or the like. Furthermore, mineral oil pyrolyzes within the desired range and without any undesirable effects. Mineral oil upon pyrolysis leaves only a relatively small carbon residue which is fully compatible with the resultant metal carbide product that is being formed. Mineral oil should be used in an amount between about 15 and 20 weight percent, based upon weight of metal oxide plus carbon.

The sol-gel technique for the preparation of uranium oxide microspheres is well known and is equally applicable to forming microspheres of other metal oxides from which aqueous colloidal sols can be made. Examples of illustrative processes for the preparation of uranium oxide microspheres by sol-gel techniques are set forth in Bulletin ORNL-3874, which is available from the Clearinghouse for Federal Scientific and Technical Information, United States Department of Commerce. For example, satisfactory uranium oxide sols can be provided by digesting uranium dioxide in hydrogen peroxide with vigorous stirring. Peptization of the uranium peroxide is then carried out using tetraethylammonium hydroxide, again using vigorous stirring.

Carbon in the desired stoichiometric amount is added to an aqueous metal oxide sol in the form of powder having a particle size less than about one micron. The carbon powder forms smaller units when being uniformly dispersed throughout the sol using vigorous mixing. Microspheres are formed from droplets of the carbon-containing metal oxide sol using a suitable process to gel the sol droplets, as is well known in the art. For example, the sol can be sprayed into a relatively stationary body of liquid wherein surface tension will cause the droplets to form spheroids as they slowly sink downward or the sol may be injected into a moving column of liquid using a suitable nozzle. Gelation may be suitably caused by dehydration or by pH change. Aggregates made of a metal oxide and carbon by such a sol-gel process from a colloidal aqueous metal oxide sol are considered to be especially suitable for the intended conversion process because the aggregates produced having a fairly high porosity and because they also have an excellent dispersion on a very small size scale which provides an aggregate that is particularly well suited to conversion from metal oxide to metal carbide without undergoing a large shrinkage in volume.

The heating for the conversion should be carried out at temperatures which are below the temperatures at which the particular metal carbide being formed would sinter. Accordingly, the temperatures at which the conversion heating is carried out are sometimes termed subsintering temperatures. For example, if uranium oxide plus carbon make up the aggregates which are being converted to uranium dicarbide, then the conversion would be carried out below about 1600° C., the approximate lower end of the temperature range for sintering $UC_2$. It is by carrying out the conversion at temperatures below the sintering temperature of the metal carbide that the large proportion of the original porosity of the aggregate is preserved in the resultant metal carbide product. If the conversion temperatures were carried out at temperatures within the sintering range of the metal carbide, substantial shrinkage would occur, and if higher temperatures in the sintering range were used, the theoretical density of the metal carbide would be approached.

In general, it is considered that to provide porous particles which are substantially metal carbide in that form alone, temperatures in the sintering range should be avoided. Although heretofore we have discussed the making of metal carbide particles having relatively high porosities, when one is concerned particularly with nuclear fuel particles, it may be satisfactory to include in the porous fuel particles an additional solid diluent material having a very low neutron capture cross section. Carbon is an example of such a material which might be used as a diluent. Of course, if such a solid diluent were included, the overall porosity of the particle would be less than those particles just discussed because the additional carbon atoms would now be occupying space that would be otherwise void.

One disadvantage of such a solid diluent-containing particle over similar particles containing the same amount of nuclear fuel carbide only in the same volume is that it would have less void space for fission product gas. The particles will each have a surrounding fission-product retentive coating that will be applied before such fuel particles are used in nuclear reactors. Because the purpose of the coatings is to contain fission products during burn-up, if there is more void space in a particle of like size and fissile content, the fission gas pressure therein will be lower for a like amount of burnup. However, one advantage to match this disadvantage may lie in less critical production standards which may make it possible to increase the rate and decrease the cost of production. It is believed that if excess carbon is uniformly dispersed throughout the aggregates that are to be converted, the presence of this excess solid substance that will not be affected by the conversion temperature serves to protect the voids during conversion, thus resulting in a lower percentage of shrinkage than when only carbon and metal oxide are provided in stoichiometric ratio to each other. It is also believed that the presence of the excess solid material also allows the employment of slightly higher conversion temperatures, say temperatures at the lower end of the sintering range, with only small increases in shrinkage during the conversion. Generally, the higher the temperature employed, the faster the conversion can be accomplished.

The following examples illustrate processes for producing porous metal carbide particles having various advantages of the invention. It should be understood that these examples are only illustrative and do not constitute limitations upon the invention which is defined by the claims which appear at the end of this specification.

EXAMPLE I

A mixture is made of uranium oxide powder, graphite powder and mineral oil. Both the uranium oxide powder and the graphite powder have a nominal size of one micron, and the surface area of both of these powders measures about 7 square meters per gram, as determined by BET nitrogen adsorption. The uranium oxide and graphite are provided in the ratio of four moles of carbon for each mole of uranium dioxide. Mineral oil is added in an amount of 17 weight percent of the total weight of uranium dioxide and graphite. In forming the mixture, the uranium dioxide and graphite powder are first dry blended, and then the mineral oil is added and blending is continued in a Hobart mixer until a mixture of homogeneous texture is produced.

The mixture is then extruded by forcing it through a colander sieve having circular openings about 1/32 inch in diameter. A charge of about 125 grams of the extruded mixture is placed in each bowl of a Fritsch planetary mill. The planetary mill controls are set for 250 r.p.m., and the mill is operated for about three minutes. At the end of this time the charge is removed from the bowls of the planetary mill, and visual examination shows that the mixture is now in the form of tiny spheroids. The spheroids are heated in a graphite crucible under vacuum conditions in a furnace to a temperature of 1500° C. Heating at this temperature is carried out for about six hours, at the end of which time the particles are slowly cooled to room temperature. Examination of the particles by X-ray diffraction shows that they are substantially entirely uranium dicarbide with only very small amounts of carbon and uranium monocarbide. Testing of the particles shows that they have a density of about 5.6 grams per cubic centimeter which is about 51 percent of the maximum theoretical density.

A 50-gram charge of these particles is coated in a fluidized bed coater using acetylene gas at a temperature of about 1100° C. to provide a low density, spongy carbon coating about 50 microns thick on each of the particles. Hydrogen is then supplied as the fluidizing gas for the fluidized bed coater, and temperature is raised to about 1500° C. About 10 percent of the hydrogen flow is split from the main line and is bubbled through methyltrichlorosilane. Under these conditions, silicon carbide is deposed upon the spongy carbon layers of each particle. Deposition is continued until each is uniformly coated with a layer about 15 microns thick. The silicon carbide deposited is about 99 percent maximum theoretical density. The temperature is then raised to about 2000° C. and helium is substituted as the fluidizing gas. When the particles have reached this temperature, about 15 percent by volume of methane is substituted for part of the helium flow. At these conditions, dense isotropic carbon is deposited. Coating is continued until a layer about 50 microns of isotropic carbon has been deposited.

Testing of the coated particles is carried out by disposing them in a suitable capsule and subjecting them to neutron irradiation at an average temperature of about 1250° C. for about three months. During this time, the total fast-flux exposure is estimated to be about $2.4 \times 10^{21}$ NVT (using neutrons of energy greater than about 0.18 mev.). The term NVT is expressed in terms of neutrons per square centimeter, and results from measurement of neutron density in neutrons per cubic centimeter, neutron velocity in centimeters per second and total duration of time in seconds. At the completion of this period of irradiation, the burnup is estimated to be about 40 to 50 percent of the fissile atoms. The fuel particles exhibit no coating failures, and the fission product release fraction is well within acceptable limits. The coated, porous nuclear fuel particles are considered to be excellently suited for use in high temperature nuclear reactors.

EXAMPLE II

Aqueous zirconyl nitrate solution purchased from Titanium Alloy Manufacturing Co. is blended with carbon powder having a particle size less about one micron, using high speed mixing. Carbon is added in the ratio of three moles of C for each mole of zirconium. The blend is then digested for about eight hours at 80° C.

Droplets of the resulting sol are injected into a moving stream of 2-ethyl-1-hexanol at about 65° C. in a 30 foot high column as generally shown in U.S. Pat. No. 3,329,745. During travel through the column, the droplets from spheroids which are gelled by dehydration. The gelled spheroids are dried by heating in a circulating air oven at a temperature of about 80° C. for several hours followed by heating to 450° F. in vacuum.

Conversion of the spheroids under vacuum is carried out at a temperature of about 2100° C. for about one hour. Examination of the resultant spheroids shows them to be substantially entirely ZrC with only very small amounts of excess carbon. The spheroids range in particle size from about 100 microns to about 500 microns. The average density measures about 4.0 g./cm.$^3$, which is just slightly less than 60 percent of the theoretical density of ZrC, i.e., about 6.7 g./cm.$^3$.

Whereas the processes have heretofore been described as being particularly applicable to making porous metal carbide particles, it is believed that they are equally applicable to other porous metal compounds which likewise result from chemical reactions in which the reaction products are a metal compound plus a substance which is gaseous at the reaction temperature. For example, porous metal nitrides might be prepared by making porous oxy-carbon intermediates from aggregates of metal oxide and carbon by partial conversion and then converting these intermediates to porous metal nitride particles by reaction with nitrogen at elevated temperatures which are below the sintering temperature of the metal nitride.

Various features of the invention are set forth in the following claims.

What is claimed is:

1. A method of making porous particles of less than about 1 mm. in diameter of metal carbide having a maximum bulk density of less than 60% theoretical, which method comprises forming discrete porous aggregates of a mixture of particulate carbon and a metal oxide each having particle sizes in the range from 0.1 micron to about 5 microns, the carbon being present in sufficient amounts to convert all of the metal oxide to the metal carbide, and said metal oxide being selected from the group consisting of the actinide series elements, titanium, zirconium, niobium, tantulum, vanadium, hafnium, tungsten, molybdenum, yttrium, technetium, and mixtures thereof, and heating said aggregates in a partial vacuum at temperatures above the temperatures at which carbon will convert the metal oxide to the metal carbide and below the sintering temperature of said metal carbide for a time sufficient to convert essentially all of said metal oxide to said metal carbide while retaining a substantial portion of the porosity of said aggregates.

2. A method in accordance with claim 1 wherein said metal oxide is uranium oxide and wherein said heating to form uranium dicarbide is carried out at temperatures less than about 1600° C.

3. A method in accordance with claim 1 wherein said aggregates are formed by agglomerating a mixture of fine particulate metal oxide, fine particulate carbon, and a carbonaceous binder which can be pyrolyzed, said binder being selected from the group consisting of coal tar pitch, polyvinyl alcohol, ethylcellulose, and mineral oil.

4. A method in accordance with claim 3 wherein said fine particulate materials have particle sizes not greater than about one micron.

5. A method in accordance with claim 4 wherein said binder is mineral oil and is used in the amount of about 15 to 20 weight percent, based upon weight of particulate metal oxide plus carbon.

6. A method in accordance with claim 4 wherein said agglomerates are made by a mechanical extrusion process.

7. A method in accordance with claim 6 wherein after extrusion said agglomerates are spheroidized in a planetary mill.

8. A method in accordance with claim 1 wherein said aggregates are spheroids produced by a sol-gel process using an aqueous metal oxide sol.

9. A method in accordance with claim 1 wherein said aggregates are spheroids of a particle size less than about one mm.

References Cited

UNITED STATES PATENTS

| | | | |
|---|---|---|---|
| 3,087,781 | 4/1963 | Levey, et al. | 176—89 |
| 3,151,037 | 9/1964 | Johnson et al. | 176—90 |
| 3,166,614 | 1/1965 | Taylor | 264—29 |
| 3,179,723 | 4/1965 | Goeddel | 264—29 |
| 3,320,179 | 5/1967 | Gens | 176—89 |
| 3,331,783 | 7/1967 | Braun | 176—89 |

FOREIGN PATENTS 792,114   3/1958   Great Britain.

OTHER REFERENCES

"3M Brand Reactor Materials," a trade bulletin published by the Minnesota Mining & Manufacturing Co. prior to June 11, 1962.

H. W. Huggins: "Characteristics of Silicon Carbide produced by Thermal Decomposition of Trimethylchlorosilane," an article appearing in the March, 1967, issue of the Ceramic Bulletin at pages 266–269.

DONALD J. ARNOLD, Primary Examiner

J. H. MILLER, Assistant Examiner

U.S. Cl. X.R.

106—43, 44; 176—91; 252—301.1; 264—29, 42, 44, 65